United States Patent [19]
Berthold et al.

[11] Patent Number: 6,097,478
[45] Date of Patent: Aug. 1, 2000

[54] FIBER OPTIC ACOUSTIC EMISSION SENSOR

[75] Inventors: John W. Berthold, Salem; Garry W. Roman, Alliance, both of Ohio

[73] Assignee: McDermott Technology, Inc., New Orleans, La.

[21] Appl. No.: 09/053,939

[22] Filed: Apr. 2, 1998

[51] Int. Cl.$^7$ ................................................. G01B 9/02
[52] U.S. Cl. ........................ 356/35.5; 356/345; 356/352
[58] Field of Search .................................. 356/352, 345, 356/35.5

[56] References Cited

U.S. PATENT DOCUMENTS

| | | | |
|---|---|---|---|
| 3,051,003 | 11/1962 | Witt | 73/388 |
| 3,056,297 | 10/1962 | Duke | 73/398 |
| 4,071,753 | 1/1978 | Fulenwider et al. | 250/227 |
| 4,078,432 | 3/1978 | Stewart | 73/705 |
| 4,162,397 | 7/1979 | Bucaro et al. | 250/199 |
| 4,342,907 | 8/1982 | Macedo et al. | 250/227 |
| 4,360,247 | 11/1982 | Beasley | 350/96.15 |
| 4,419,895 | 12/1983 | Fuller | 73/517 A |
| 4,421,979 | 12/1983 | Asawa et al. | 250/227 |
| 4,436,995 | 3/1984 | Whitten | 250/227 |
| 4,443,700 | 4/1984 | Macedo et al. | 250/227 |
| 4,459,477 | 7/1984 | Asawa et al. | 250/227 |
| 4,463,254 | 7/1984 | Asawa et al. | 250/231 R |
| 4,472,628 | 9/1984 | Whitten | 250/227 |
| 4,534,222 | 8/1985 | Finch et al. | 73/653 |
| 4,618,764 | 10/1986 | Harmer | 250/227 |
| 4,656,353 | 4/1987 | Thompson | 250/231 R |
| 4,674,900 | 6/1987 | Erzsebet et al. | 374/131 |
| 4,678,903 | 7/1987 | Wlodarczyk et al. | 250/227 |
| 4,701,614 | 10/1987 | Jaeger et al. | 250/227 |
| 4,724,316 | 2/1988 | Morton | 250/227 |
| 4,727,254 | 2/1988 | Wlodarczyk | 250/338 |
| 4,770,492 | 9/1988 | Levin et al. | 350/96.29 |
| 4,800,267 | 1/1989 | Freal et al. | 250/227 |
| 4,810,051 | 3/1989 | Kiele | 350/96.15 |
| 4,858,462 | 8/1989 | Coulter et al. | 73/40.5 A |
| 4,871,908 | 10/1989 | Skuratovsky et al. | 250/227 |
| 4,918,305 | 4/1990 | Wlodarczyk et al. | 250/227.14 |
| 4,928,004 | 5/1990 | Zimmermann et al. | 250/227.14 |
| 4,930,862 | 6/1990 | Miers et al. | 350/96.29 |
| 4,933,545 | 6/1990 | Saaski et al. | 250/227.14 |
| 4,950,886 | 8/1990 | Claus et al. | 250/227.14 |
| 5,062,704 | 11/1991 | Bateman | 356/73.1 |
| 5,132,529 | 7/1992 | Weiss | 250/227.16 |
| 5,189,299 | 2/1993 | Zimmermann et al. | 250/227.16 |

(List continued on next page.)

OTHER PUBLICATIONS

Murphy, Kent A. et al. "Acoustic Wave Response of the Extrinsic Fabry–Perot Interferometric (EFPI) Optical Fiber Sensor", Adaptive Structures and Material Systems–American Society of Mechanical Engineers, Aerospace Div., AD vol. 35, published by ASME, New York, NY 1993, pp. 395–399.

*Primary Examiner*—Robert H. Kim
*Assistant Examiner*—Andrew H. Lee
*Attorney, Agent, or Firm*—Robert J. Edwards; Robert C. Baraona; Eric Marich

[57] ABSTRACT

A fiber optic acoustic emission (FOAE) sensor particularly suitable for vibration sensing in a hostile environment has a pair of optical fibers each having an end face. In one embodiment, a hollow tube or core having opposite open ends receives the end faces of the optical fibers. Means are provided for fixing the optical fibers in the hollow core with the end faces facing each other and spaced by a distance from each other in the core. A signal processing unit is connected to the optical fibers for supplying light to, and for receiving light from, the optical fibers and for measuring variations in optical phase which result in changes in the light intensity due to vibrations of the hollow core. The hollow core is fixed in a resonant cylinder, and the resonant cylinder is fixed in a housing to complete the sensor. Other embodiments dispense with the need for the hollow tube or core and employ means for fixing the optical fibers within a precision hole, advantageously produced by electrical discharge machining (EDM) or similar processes, provided in the resonant cylinder. A system employing these embodiments of the FOAE sensor is also disclosed.

24 Claims, 7 Drawing Sheets

U.S. PATENT DOCUMENTS

| | | | |
|---|---|---|---|
| 5,202,939 | 4/1993 | Belleville et al. | 385/12 |
| 5,243,670 | 9/1993 | Bonicel | 385/13 |
| 5,275,053 | 1/1994 | Wlodarczyk et al. | 73/705 |
| 5,301,001 | 4/1994 | Murphy et al. | 356/35.5 |
| 5,345,519 | 9/1994 | Lu | 385/12 |
| 5,351,655 | 10/1994 | Nuspl | 122/504 |

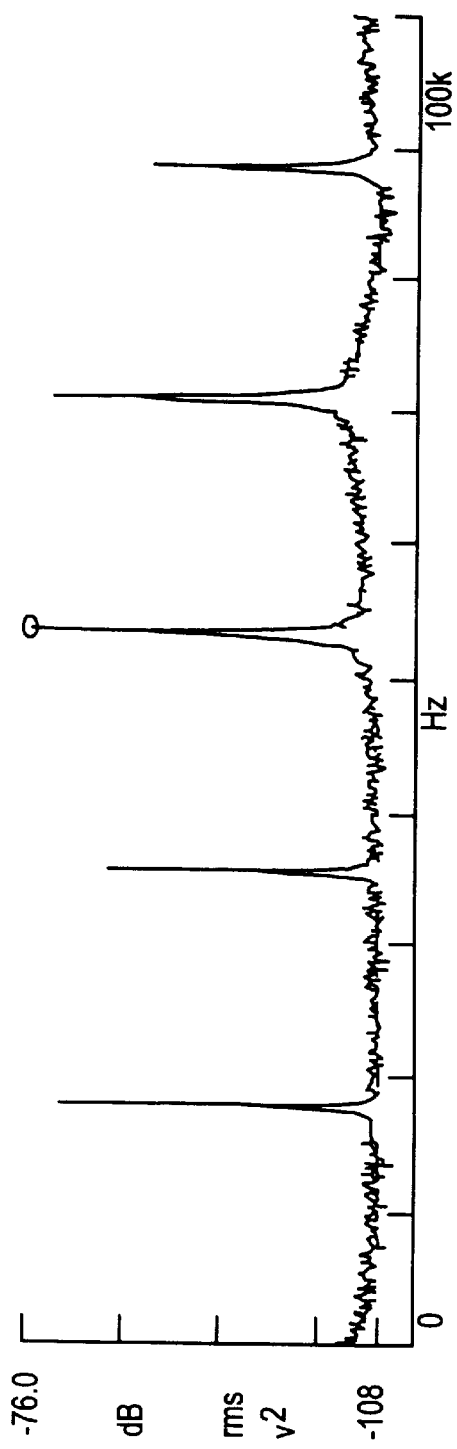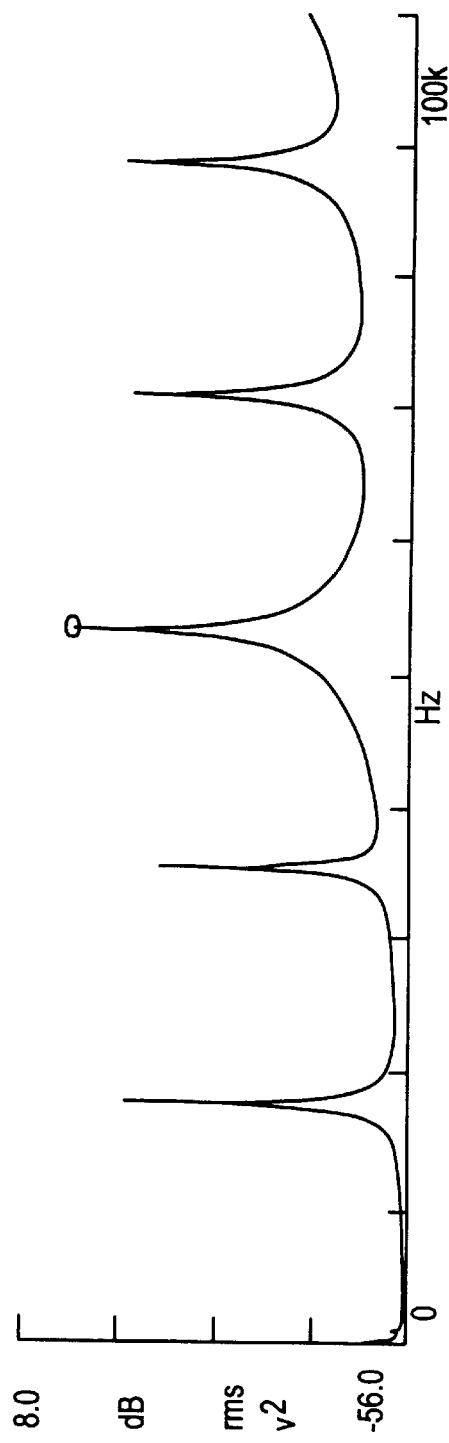

FIBER OPTIC ACOUSTIC EMISSION SENSOR

FIELD AND BACKGROUND OF THE INVENTION

The present invention relates in general to sensors, and in particular to a new and useful acoustic emission sensor suitable for use in hostile environments. According to the present invention, a high-frequency fiber optic vibration sensor is adapted to acoustic emission sensing in hostile high-temperature environments, high EMI environments, and applications where explosion hazards exist.

Presently, piezoelectric transducers of the lead zirconate titanate (PZT) type are used as detectors in commercial systems such as acoustic leak locators on boilers. These leak locators can detect and analyze acoustic energy that results when high-pressure steam exits a pin-hole leak in a steam generator tube, and can distinguish between a leaking tube and an operating sootblower. Since the operating temperature range of the PZT acoustic detector is limited to 150° C., an acoustic waveguide must be used to transfer acoustic energy out of the boiler. The waveguide introduces a loss factor of about ten into the detection system, however. See for example, U.S. Pat. Nos. 4,858,462 and 5,351,655.

An optical fiber modulator is disclosed in U.S. Pat. No. 4,810,051. The use of optical fibers for measuring pressure or strain is also disclosed in U.S. Pat. No. 4,770,492. See U.S. Pat. No. 4,678,903 for a self-aligning fiber optic microbend sensor.

A temperature-compensating fiber optic strain sensor is disclosed in U.S. Pat. No. 5,345,519. A pressure system using an optical resonator cavity is disclosed in U.S. Pat. No. 4,933,545. Also see U.S. Pat. No. 4,928,004 for a method and apparatus for measuring strain, utilizing optical fibers. A fiber optic acoustic sensor is disclosed in U.S. Pat. No. 4,162,397. Also see U.S. Pat. No. 4,071,753.

U.S. Pat. No. 4,950,886 to Claus et al. discloses a partially reflecting optical fiber splice for temperature and strain measurement. A particular feature of the '886 patent is that it avoids the need to rely upon microbends and instead uses measurement techniques that correspond to changes in an air gap between the fibers in a particular splice. A system of optical fibers and splices can be located throughout a structure to yield an array of strain and temperature measurements.

U.S. Pat. No. 5,301,001 to Murphy et al. discloses extrinsic fiber optic displacement sensors and displacement sensing systems. The patent relates generally to fiber optic interferometric sensors and, more particularly, to extrinsic Fizeau interferometric fiber optic sensors having a particular application in hostile environments to dynamically monitor strain, temperature or pressure in mechanical structures. As used therein, "strain" is defined to mean strain, temperature, pressure, magnetic fields, and other like phenomena that can be translated into a displacement depending upon the application. Further, the inventors characterized known Fabry-Perot interferometers as having multiple reflections within a cavity, while Fizeau interferometers were said to operate on the principle of a single reflection within the cavity.

U.S. Pat. No. 5,202,939 to Belleville et al. disclosed a Fabry-Perot optical sensing device for measuring a physical parameter such as pressure, temperature, the refractive index, and especially strain in or deformation of a body. A Fabry-Perot interferometer is optically coupled to a wedge-shaped Fizeau interferometer cavity to produce a spatially-spread light signal indicative of the transmittance or reflectance properties of the Fabry-Perot interferometer, the light signal being indicative of the parameter being sensed.

U.S. Pat. No. 5,189,299 discloses an apparatus and method for sensing strain in a waveguide. A comprehensive description of a Fabry Perot Interferometer (EFPI) can be found in an article by Murphy, et al., found in the Proceedings of the 1993 ASME Winter Annual Meeting, New Orleans, La., "Acoustic Wave Response of the Extrinsic Fabry-Perot Interferometer (EFPI) Optical Fiber Sensor", available in a publication, *Adaptive Structures and Material Systems,* Aerospace Division American Society of Mechanical Engineers, at AD-Vol. 35, pp 395–399, published by ASME, New York, N.Y.

SUMMARY OF THE INVENTION

The use of in-situ fiber optic acoustic emission sensors would allow an improvement in sensitivity in leak detection of about a factor of ten because the lossy waveguide would not be needed. A fiber optic acoustic emission (FOAE) sensor could be located directly on the boiler wall since the FOAE sensor has a potential operating temperature above 400° C. Furthermore, fiber optic acoustic emission sensors are potentially low-cost devices that can be multiplexed to a signal processor using fiber optic multiplexing methods. Thus, multiple FOAE sensors could be located on a boiler wall to obtain good area coverage for low system cost, or they could be located at a plurality of discrete locations all over the boiler or industrial apparatus of interest.

Accordingly, one aspect of the present invention is to provide a fiber optic acoustic emission sensor for vibration sensing. The sensor comprises a pair of optical fibers each having an end face. A hollow core having opposite open ends is provided for receiving the end faces of the optical fibers; means are provided for fixing the optical fibers in the hollow core with the end faces facing each other and spaced by a distance from each other in the core. Finally, a resonant cylinder is provided in which the hollow core is fixed. The resonant cylinder in which the hollow core is fixed comprises a base plate connected to the cylinder having means for receiving the optical fibers and a cover connected to the base plate and over the resonant cylinder. To provide an operable system using the FOAES, signal processing means are provided and connected to the optical fibers for supplying light to, and receiving light from, the optical fibers and for measuring variations in optical phase which result in changes in the light intensity due to vibrations of the hollow core. The light intensity variations are indicative of the sensed vibrations.

Alternative embodiments of the FOAES of the present invention dispense with the hollow tube and instead employ means for fixing the optical fibers directly into a precision hole in the resonant cylinder. The FOAES of the present invention is simple in design, rugged in construction and economical to manufacture.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

BRIEF DESCRIPTION OF THE DRAWINGS

In the drawings:

FIG. 6A and 6B is a set of correlated graphs plotting a signal against frequency of the sensor of the present invention (FIG. 6A) as compared to a known PZT sensor (FIG. 6B);

DESCRIPTION OF THE PREFERRED EMBODIMENTS

Figure 1:
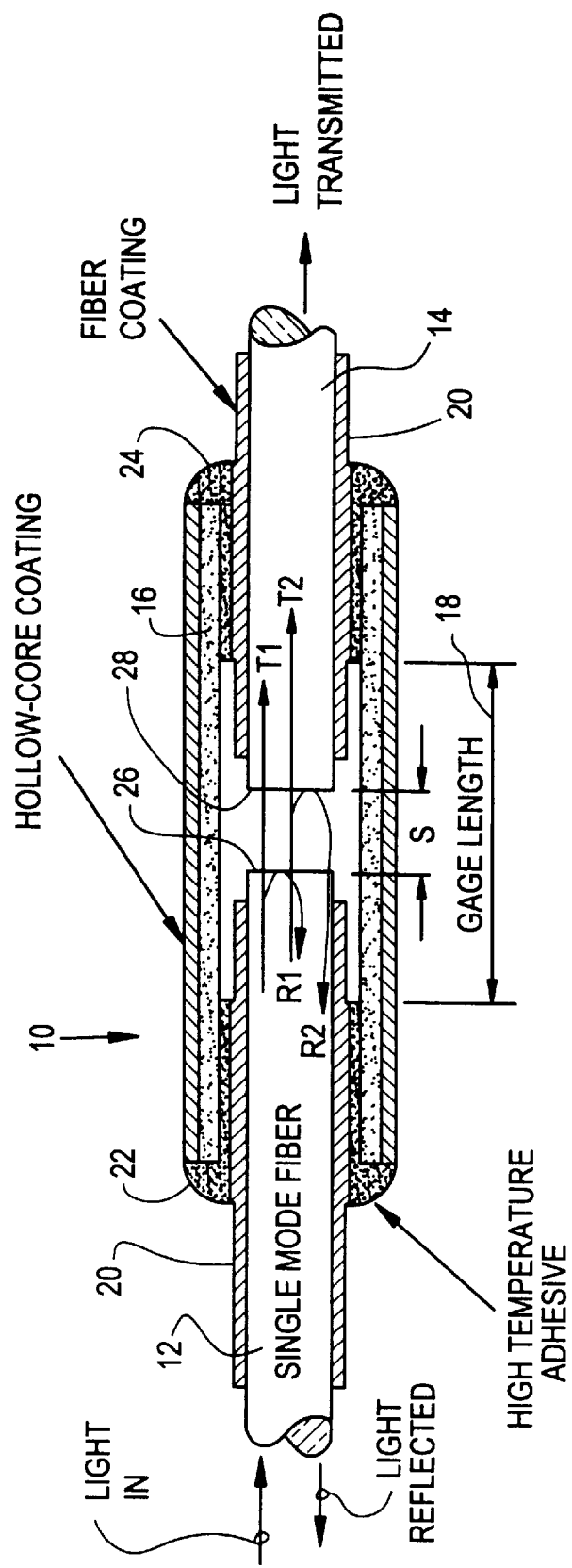
FIG. 1 is a sectional view of an Extrinsic Fabry Perot Interferometer (EFPI) used in the present invention.
Figure 2:
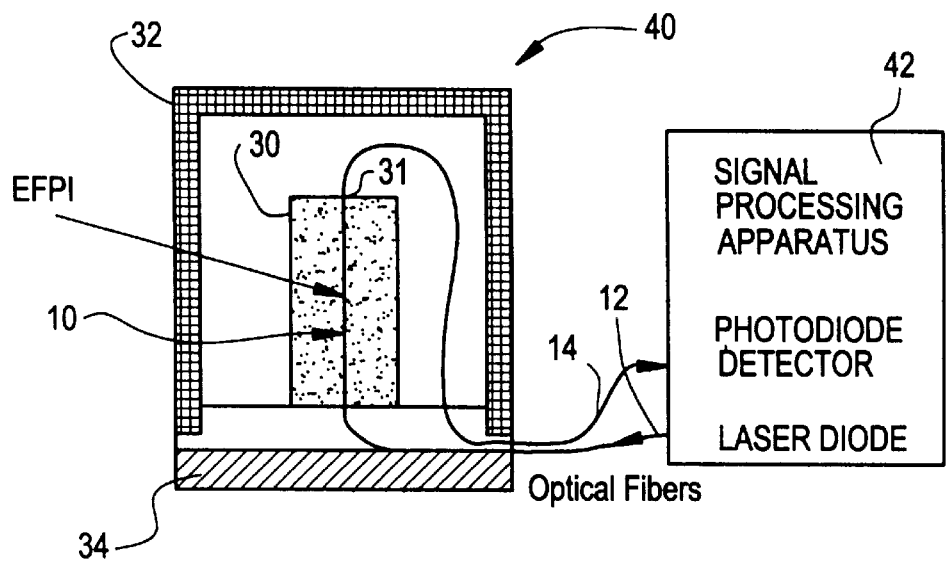
FIG. 2 is a sectional view of a fiber optic acoustic emission sensor (FOAES) according to the present invention.
Figure 3:
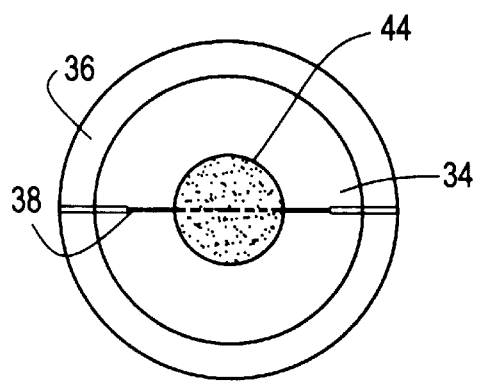
FIG. 3 is a top plan view of a base plate for the sensor.
Figure 4:
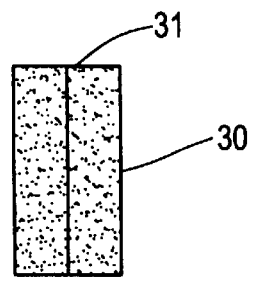
FIG. 4 is a sectional view of a resonant cylinder forming part of the sensor of the present invention.
Figure 5:
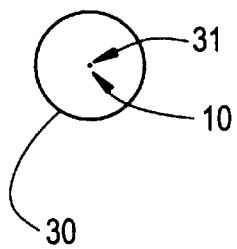
FIG. 5 is a top plan view of the resonant cylinder.

Referring to the drawings generally, wherein like numerals represent the same or similar elements throughout the several drawings, and to FIGS. 1–5 in particular, one aspect of the present invention comprises a fiber optic acoustic emission sensor or FOAE sensor (FOAES) which can be used in the hostile environment associated with a boiler or steam generator, such as those used in the production of steam for industrial processes or those used in the electric utility power generation field, or other industrial apparatus. It is understood, however, that while the term "acoustic emission" is used in the present discussion for the sake of convenience, the present invention is not limited to the detection of vibrational signals only in the range capable of detection by the human ear, and it can also be applied to the task of detecting infrasonic and/or ultrasonic vibrations as well. Indeed, as the present description progresses, it will be seen that one typical application of the present invention involves sensing "acoustic emission" vibrational signals in the 100 kHz range, far above the threshold of human hearing. Further, the environmental application of the present invention need not be "hostile" in terms of temperatures, pressures, radiation or other factors inimical to human or other life forms. Thus, capability of the present invention to function in such environments is to be viewed as an advantage and not as a limitation. Finally, the present invention is not limited to the sensing of airborne vibrations, and can be easily adapted to the task of sensing vibrations carried in other media such as fluids or solids—any media capable of transmitting vibration.

The fiber sensor chosen to evaluate for the acoustic emission application of the present invention is called an Extrinsic Fabry Perot Interferometer (EFPI). This EFPI sensor was developed as an optical strain gage. An EFPI from Fiber & Sensor Technologies, Christiansburg, Va. is shown at 10 in FIG. 1.

The ends of two optical fibers 12, 14 are closely spaced by a known distance S apart, and the optical fibers are fixed, such as by epoxy, embedding, adhesive, interference fit approaches or other means at 22 and 24 inside a hollow glass core 16. The particular type of means for fixing the optical fibers is relatively unimportant; while they must be suited for the temperature and other environmental conditions to which the sensor will be exposed, the only important aspect is that the fibers be securely fixed in the hollow tube 16 (or resonant cylinder 30 as described infra) so that there is no slippage. Optical fibers 12, 14 typically have a diameter of approximately 0.125 mm (0.005"). The epoxy attachment points determine the gage length 18 for strain gage applications. Four EFPI sensors were tested for this application. All had 10 mm gage lengths. Two had the same spacing S=10 μm. The other two were made with S=30 μm and S=400 μm. The fibers 12, 14 are also typically provided with a buffer coating at 20 to protect them from environmental hazards. The ends of the fibers 12, 14 inside the hollow core 16 are coated at 26, 28 with partial reflectors (R=80%). The partial reflectors could be created by coating the ends of the fibers at 26, 28 with one of a semiconductor oxide, a reflective metal fiber, or a series of dielectric films to increase the reflectivity of the base ends of the fibers. These approaches are well known to those skilled in the fiber optics arts. Thus as shown in FIG. 1, light incident from the left is partially reflected in beams R1 and R2 from each fiber end and partially transmitted in beams T1 and T2 as well. The multiple reflected beams and/or multiple transmitted beams are detected with a silicon photodiode (not shown in FIG. 1). The optical fibers support only one guided mode, and if the light source is a coherent laser, then the reflected beams and transmitted beams will interfere on the active area of the photodiode.

In transmission, the light intensity changes between minimum and maximum values according to Eq. (1). Thus the output current from such a silicon photodiode varies as the relative phase between the multiple interfering light beams.

$$\tau = I_t/I_i = 1 + [4R/(1-R^2)]\sin^2(\theta/2)$$

$$\theta \approx 4\pi S/\lambda \qquad (1)$$

Where:

| | |
|---|---|
| τ = transmissivity | R = reflectivity = 0.8 |
| $I_t$ = transmitted light intensity | λ = wavelength = 0.85 μm |
| $I_i$ = incident light intensity | S = spacing = 10 μm |

In order to improve the acoustic sensitivity of the EFPI sensors used in the invention, a cylindrical acoustic cavity was designed to be resonant at 100 kHz. The design calculations used resulted in a resonant cylinder 30 with dimensions shown in FIGS. 2–5. An EFPI sensor 10 (S=10 μm) was epoxied into the resonant cylinder 30 for characterization tests.

The resonant cylinder 30 was modeled as a clamped-free rod fixed at one end and free at the other, having length L and cross-sectional area A. From Meirovitch, *Analytical Methods in Vibrations,* MacMillan publishers, 1969, p. 151, the longitudinal vibrations of such a rod can be represented by the following equation:

$$w_1 = \frac{\pi}{2}\sqrt{\frac{EA}{mL^2}} \qquad (2)$$

Where:

| | |
|---|---|
| E = modulus of elasticity of rod (psi) | m = weight of rod (lb) |
| A = cross-sectional area of rod (in²) | L = length of rod (in) |

Since:

$$m = \frac{\rho A}{g} \quad (3)$$

Where:
m=weight (lb)
ρ=density (lb/in³)
A=area (in²)
g=acceleration due to gravity=386 in/sec²,
Equation (2) can be rewritten as follows:

$$2\pi f_1 = \frac{\pi}{2}\sqrt{\frac{EAg}{\rho AL^2}} \quad (4)$$

$$f_1 = \frac{1}{4L}\sqrt{\frac{Eg}{\rho}} \quad (5)$$

$$f_1 = \frac{4.91}{L}\sqrt{\frac{E}{\rho}} \quad (6)$$

Thus, for a given L, $f_1$ will be greatest for a material with a high E/ρ (i.e., specific stiffness), and once a material is selected, the $f_1$ can be adjusted by varying L. Tables of specific stiffness for various materials are available; see for example, the December 1992 issue of *Materials Engineering* at page 16. For a polycrystalline glass rod, the specific stiffness is $184 \times 10^6$ in($45 \times 10^5$ m).

The FOAE sensor of the invention has a sensitivity within a factor of 12 of that of the PZT acoustic emission (AE) detector. Considering that the waveguide used with the PZT AE detector introduces a 10X signal loss, the FOAE sensor at 40 in FIG. 2 could be used in a boiler (in-situ) and performance equivalent to the PZT should be achievable. It should be straightforward to improve the sensitivity of the FOAE sensor to meet or exceed the sensitivity of the PZT by doing the following:

Increase the reflectivity of the fiber end reflectors (see Eq (1)).

Optimize the gain of the photodiode preamplifier.

Increase the diode laser power.

Optimize the quality factor (equal to a ratio of the energy stored divided by energy dissipated) of the resonant cylinder in which the FOAE sensor is embedded.

It should be noted that while the design goal for this cylinder was to set its resonant frequency near 100 kHz, it was not possible to test it at that frequency. Over the frequency range where tests were performed, the frequency response turned out to be quite flat.

Figure 9:
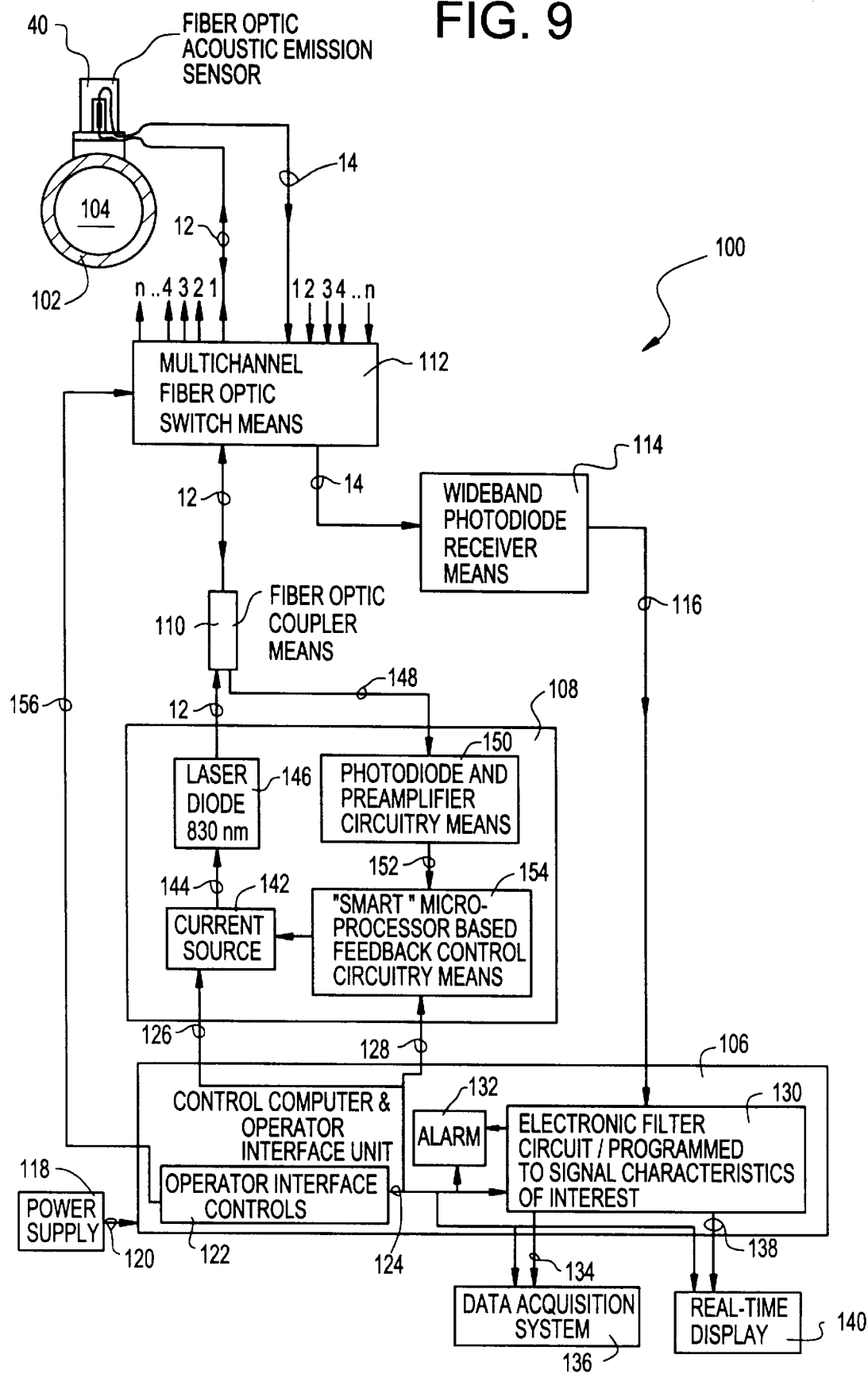
FIG. 9 is a schematic representation of how the FOAES of the present invention would be applied in a system to monitor one or more locations on a typical industrial apparatus, such as boiler or steam generator, of interest.

One important item to note is that the FOAE sensor is sensitive to temperature. In many applications, it is not practical to control temperature to within ±1° F. to maintain the optimum sensitivity of the FOAE sensor. However, it is straightforward to compensate for temperature changes by using the reflected power from the EFPI as a feedback control signal. Since the laser emission wavelength changes over a small range with input current, the laser current could be modulated to maintain the EFPI at the optimum operating point. The reflected power signal from the EFPI would be used in a feedback loop to automatically adjust the laser current. A system employing such concepts is schematically shown in FIG. 9, and is discussed infra.

Characterization testing of the FOAE sensor was conducted. The most important result from these tests is the spectral plots shown in FIG. 6.

Fiber optic interferometric sensors which detect changes in optical phase have been shown to have superior sensitivity compared to other fiber sensor types which detect changes in light intensity, polarization, or wavelength. Implementation of a fiber optic interferometric sensor for acoustic emission monitoring is much more straightforward than for strain monitoring. This is because, to measure strain, the sensor must have excellent long-term stability and low drift for measurement of very slowly changing (essentially DC) parameters. For acoustic emission monitoring, high frequency AC signals must be measured. Thus, the sensor output signal can be electronically filtered to pass the high frequency signals of interest, and reject the very slow variations that cause drift.

A test setup used to evaluate the performance of the EFPI sensors of this invention measured the light transmission as a function of fiber end separation S by heating the resonant cylinder 30. The measured sensor transmission vs. change in fiber separation S (proportional to temperature change) was plotted. The change in transmissivity τ in Eq (1) was found to directly relate to the thermal expansion of the cylinder material (416 stainless) via the relationship $$\Delta S = \alpha L \Delta T \quad (7)$$

Where:
a=thermal expansion coefficient=$5 \times 10^{-6}$ in/in/°F.
L=10 mm (0.394") (gage length of hollow core bonded to resonant cylinder).

Figure 7:
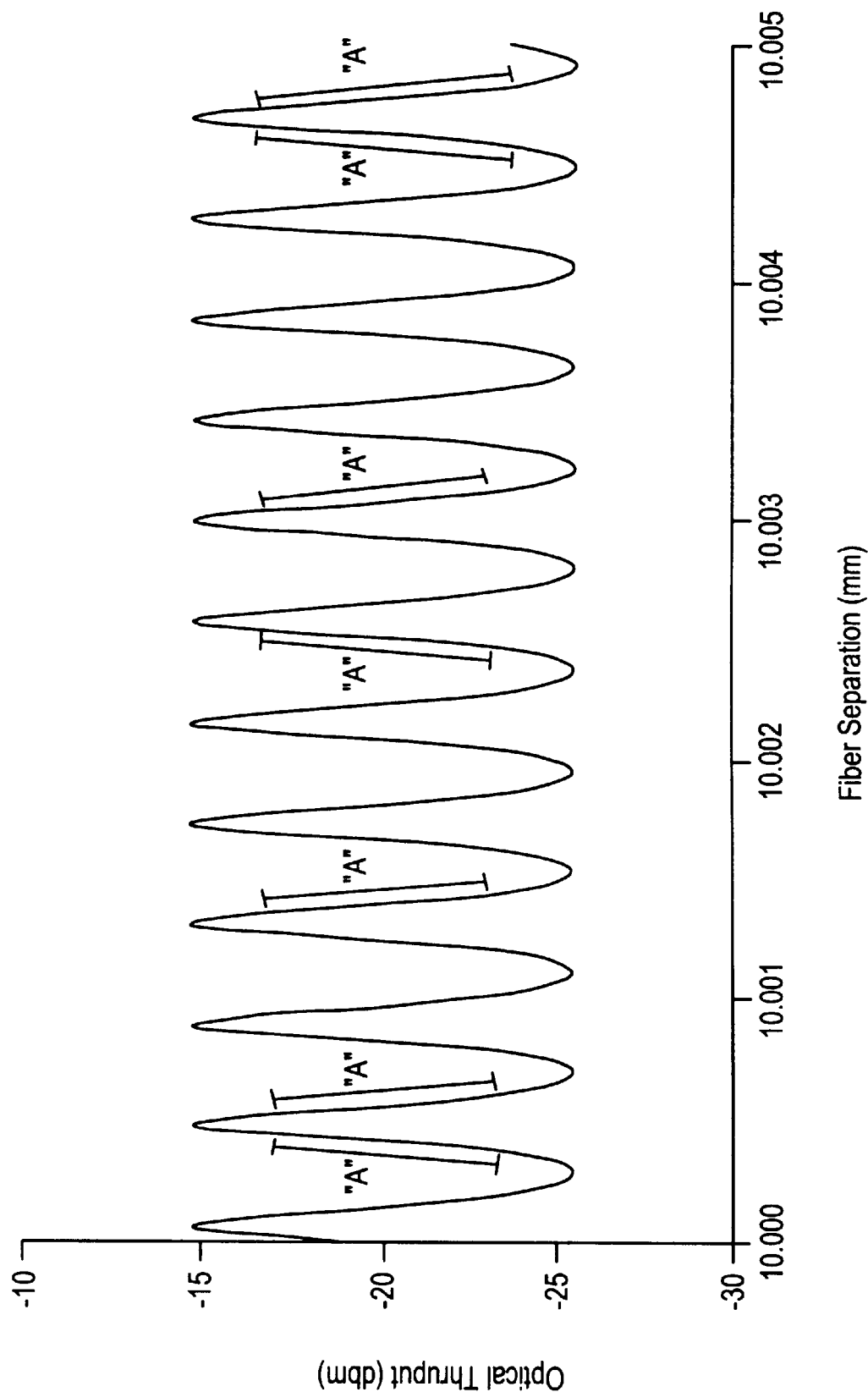
FIG. 7 is a graph showing optical thruput (dbm) versus fiber separation (mm), illustrating the optimum sensor operating point or region "A" as being on the slope of the interference fringes.

Using Eqs. (1) and (7), it is straightforward to calculate that for a temperature change of 80° F., the EFPI will sweep through about 23 interference fringes, which agrees with the measured result. Note that to obtain the best sensitivity, the optimum sensor operating point is on the slope of one of (and on any of) the interference fringes, where the relationship is substantially linear. This point or region is illustrated as any of the bar segments designated "A" in FIG. 7. To maintain the sensor at this operating point it is necessary to either control the temperature to ±1° F., or to find a method to compensate for temperature changes, as explained earlier.

Figure 8:
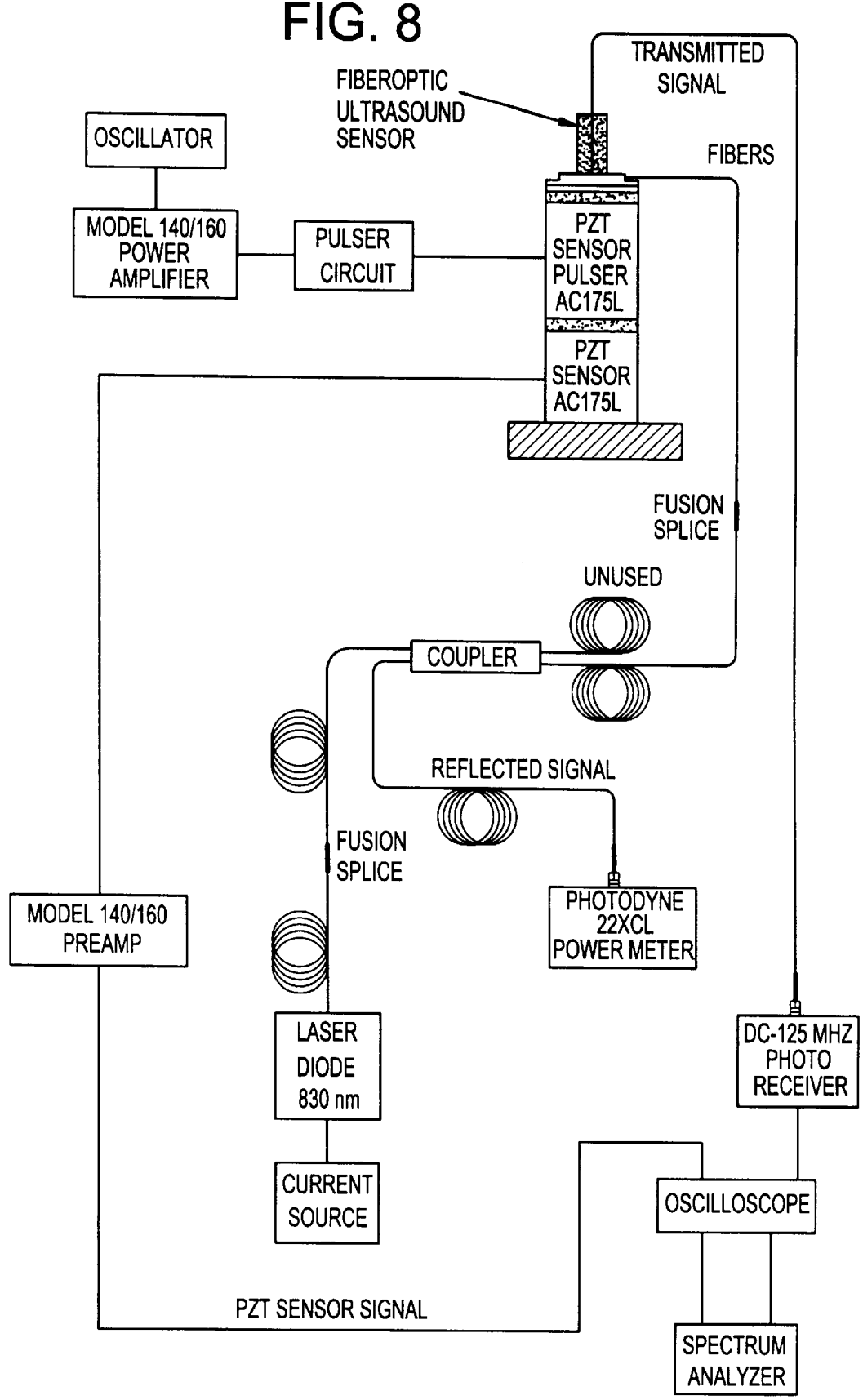
FIG. 8 is a diagram of an experimental setup used to characterize the FOAES of the present invention.

In one experiment, a frequency tunable pulser was used to provide an acoustic input signal to the cylinder in which the EFPI was mounted. Please refer to FIG. 8 for a diagram of the experimental setup apparatus used. The pulser was mounted to both the FOAES and PZT detector, and tuned to 17.75 kHz drive frequency. The pulser output was not a perfect sine wave, so harmonics of the 17.75 kHz fundamental were also generated. The output spectra from both the FOAES and PZT were viewed simultaneously. It was possible to tune the EFPI to the optimum operating point by changing the temperature of the FOAES and monitoring the reflected power from the EFPI using an optical power meter.

A series of plots showed how the signal-to-noise ratio (S/N) from the FOAES changes as the EFPI sensor is tuned through the optimum operating point. In each plot, the S/N was estimated for the FOAES. Another plot showed the output from the PZT detector, which was mounted to the opposite side of the pulser. FIG. 6A is an example of the FOAES results and FIG. 6B is the PZT results. The EFPI reflected power was 1.53 dBm, measured with a Photodyne power meter.

To obtain a direct comparison of the FOAES and PZT, the FOAES was removed from the pulser and the PZT was mounted in the identical location. The S/N for the PZT detector was estimated to be 50 dBV. The best S/N obtained for the FOAES at optimum tuning of the EFPI was 28.5 dBV (see FIG. 6). The difference in S/N values obtained is a direct measure of the difference in sensitivity between the FOAES and PZT. This sensitivity difference amounts to 21.5 dBV or about a factor of 12 lower sensitivity for the EFPI. Note that for these tests, neither the FOAES nor the PZT were operating at their resonant frequencies.

Additional thermal tests were performed. The purpose of these tests was to determine the relative phase shift between the transmitted and reflected signals from the EFPI (0.23 radians). The phase shift is caused by the metallic fiber end reflectors used in the EFPI. The optimum operating point in transmission and reflection was identified.

Figures 10, 11, 12:
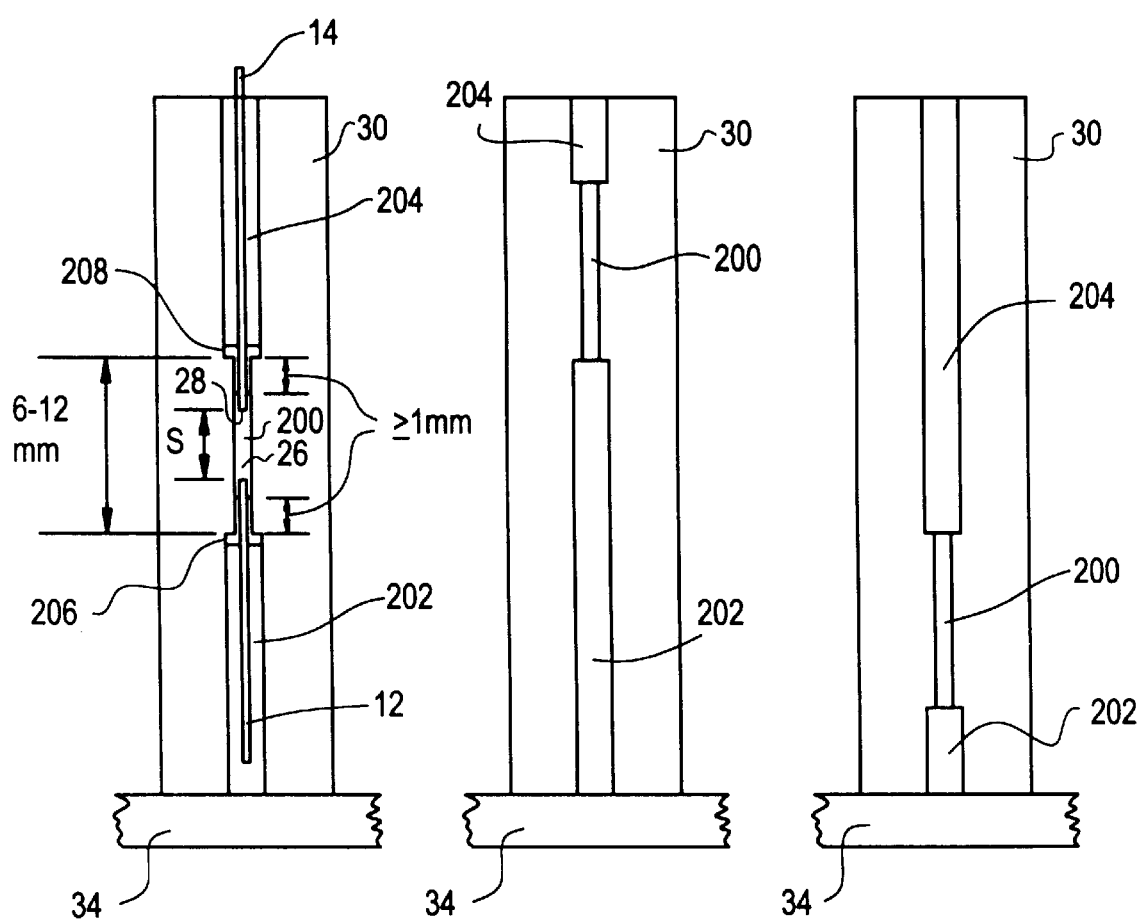
FIGS. 10–12 are sectional views of other embodiments of the present invention which dispense with the hollow tube structure of an EFPI.

Returning to FIG. 2, the FOAE sensor 40 of the present invention includes the EFPI component generally designated 10 which is fixed, for example, using epoxy or other fixing means within a hole 31 (typically having a diameter of approximately 0.016") within the resonant cylinder 30 which is also fixed on top of a base 34. The EFPI component 10 is generally located substantially at the axial midpoint of the resonant cylinder 30 so that provisions for strain relief of the optical fibers 12, 14 extending therefrom are not required. However, this "midpoint" location is not required and the EFPI component 10 could generally be located anywhere along the length of the resonant cylinder 30. This aspect is illustrated in FIGS. 10–12, discussed infra, in connection with an alternative embodiment of the invention. An annular rim 36 around the upper surface of the base 34 forms a seat for receiving a lower end of a cylindrical cover 32 which, like base 34, is made of stainless steel and has substantially flat and parallel upper and lower surfaces. A radial or diametric groove 38 having a width of, for example, 0.012 inches and a depth of about 0.1 inches is provided in the base 34 for accommodating the optical fibers 12 and 14. The optical fibers 12 and 14 are connected to signal processing apparatus means schematically represented at 42 which supplies a light signal to and receives a light signal from the optical fibers, said light signal being modulated by the resonant vibrational signal to which the FOAE sensor 40 is exposed. A blind bore 44 is also machined on the upper central surface of base plate 34 and has a diameter of about 0.255 inches and a depth of about 0.010 inches for receiving the lower end of resonant cylinder 30.

In FIGS. 2–5, resonant cylinder 30 may have a length of 0.50" and a diameter of 0.25". The cylindrical cover 32 may extend 0.75" above the annular rim or seat 36. Base 34 may have a diameter of 0.75" and a height of 0.200". Annular rim or seat 36 may be located 0.05" below an upper surface of the base 34 and may have an inside diameter of 0.625".

Referring to FIG. 9, there is shown a system, generally designated 100, which employs the concepts of the present invention and can be used to monitor acoustic emissions from one or more of a plurality of sources. As shown therein, the FOAE sensor 40 is affixed to a component of interest, for example a steam pipe 102 which contains high pressure steam 104 therein. In such an application, the FOAE sensor 40 is being used to detect a steam leak from the pipe 102. Typical applications of such a system would be in the environment of steam generating apparatus for industrial purposes or utility power generation.

The major components of system 100 comprise a control computer and operator interface unit 106 which provides for the transmission and reception of light to and from the FOAE sensor 40. Control computer and operator interface means 106 controls the production and calibration of the laser light signal via laser light transmitter/receiver means 108. A transmitted light signal is sent via fiber optic coupler means 110 through optical fiber 12 to multi-channel fiber optic switch means 112, and then to FOAE sensor 40. Light reflected from the Extrinsic Fabry Perot Interferometer (EFPI) 10 within the FOAES 40 returns back along optical fiber 12 through the multi-channel fiber optic switch means 112, and coupler means 110, back to the laser light transmitter/receiver means 108 to provide for temperature control of the FOAE sensor 40. Light transmitted through the EFPI 10 within the FOAES 40 is conveyed along optical fiber 14 back through multi-channel fiber optic switch means 112 and then to a wide band photodiode receiver means 114 which produces a signal transmitted along line 116 back to the control computer and operator interface unit 106.

The control computer and operator interface means 106 is provided with power from an external power supply 118 via line 120. Operator interface controls 122 in the control computer and operator interface unit 106 are connected to laser light transmitter/receiver means 108 via lines 126 and 128. Signals transmitted along line 116 representative of the transmitted light from the FOAE sensor 40 are provided to an electronic filter circuit means 130 in unit 106. In a given application, electronic filter circuit means 130 is tuned or programmed to pass the acoustic signal frequencies of interest and reject other frequencies that contain no useful information (i.e., noise). Electronic filter circuit means 130 is also under the control of operator interface controls 122 via line 124. Once the signal provided along line 116 has been processed by the electronic filter circuit means 130, a signal indicative thereof can be provided to alarm means 132, which can be visual, audible, or a combination of both; via line 134 to a data acquisition system 136; or via line 138 to real time display means 140. Again, the interface controls 122 can be used to activate or reset alarm means 132, or to enable data to be acquired by the data acquisition system 136 or displayed by real time display means 140.

Laser light transmitter/receiver means 108 preferably comprise several components; including a variable current source means 142 which, via line 144, controls the emission wavelength of light from laser diode means 146 that is sent along optical fiber 12 to the fiber optic coupler means 110. Reflected light from FOAE sensor 40 passing back along optical fiber 12 through fiber optic coupler means 110 is provided along optical fiber 148 to photodiode and preamplifier circuitry means 150. Photodiode and preamplifier circuitry means 150 produces a signal transmitted along line 152 to a "smart" microprocessor based feedback control circuitry means 154, which is used to compensate for temperature changes of the FOAE sensor 40 by tuning the laser diode 146 emission wavelength to maintain optimum sensitivity. It is understood that while these various functions have been separately identified as part of laser light transmitter/receiver means 108, commercially available devices encompassing all of these functions are available. By way of example and not limitation, laser light transmitter/receiver means 108 could advantageously be a model TD-6100 Laser Diode Controller produced by ILX Lightwave Corporation. This commercial device has more than sufficient capability and low noise current capabilities to achieve satisfactory results with the present system 100.

As indicated earlier, the system 100 of the present invention can be applied to provide for monitoring of a plurality of discrete locations of interest. Accordingly, the multi-channel fiber optic switch means 112 can be provided with 1, 2, 3, 4 . . . n connections to and from such a plurality of FOAE sensors 40. The operator interface controls 122 in control computer and operator interface unit 106 would control the operation of the multi-channel fiber optic switch means 112 via line 156. In this way, the system ensures the transmission and reception of light signals from the same FOAE sensor 40 at any given point in time. The control computer and operator interface unit 106 can be programmed to continuously scan some or all of the individual channels 1, 2, 3, 4 . . . n, or to individually focus its attention upon a specific channel as determined by the human operator. As the system scans the various FOAE sensors 40, the control computer and operator interface unit 106 via the laser light transmitter/receiver means 108 will automatically sense the magnitude of the reflected light and control the operation of the laser diode 146 to ensure optimum sensitivity, and to ensure that the sensor is operating on the slope (region A) of any one of the interference fringes as discussed earlier in connection with FIG. 7. Similarly, operator interface controls 122 can be used to tune or program the electronic filter circuit means 130 so that the appropriate acoustic signal frequencies are detected, and to establish the setpoints beyond which alarm means 132 will be activated.

Referring to FIGS. 10, 11 and 12, there are shown further embodiments of the resonant cylinder 30 of the FOAES 40 which dispense with the need for the hollow glass tube 16 identified as being part of the EFPI in connection with FIG. 1. Instead, in these embodiments, the ends of the optical fibers 12, 14 are inserted into a precision hole 200 provided in the resonant cylinder 30. Precision hole 200 is so small that it is advantageously produced by an electrical discharge machining (EDM) process. As with the case of the FOAES 40 employing the EFPI component 10, the precision hole 200 and its associated optical fiber ends can be located substantially anywhere along the axial length of resonant cylinder 30, and access to the precision hole 200 is provided from both ends of the resonant cylinder 30 via access holes 202 and 204. This is illustrated in FIGS. 10, 11 and 12. The length of the precision hole 200 must be at least longer than 2 mm plus distance S to allow for at least 1 mm at each end of each optical fiber 12, 14 to be secured by epoxy or alternate means for fixing them (as described earlier) at 206, 208 and to provide the necessary spacing distance S between the ends of the fibers 12, 14. However, the EDM process can be used to produce a precision hole 200 having a depth of at least 6 mm and up to 12 mm, which is more than long enough to secure the ends of the optical fibers in proper alignment with each other, and longer holes 200 would be preferred to enhance securing and alignment of the ends of the fibers 12, 14 with respect to each other. Of course, these alternative embodiments of the resonant cylinder 30 can be equally applied in the FOAES 40 and used in the system of FIG. 9 without difficulty.

While specific embodiments of the invention have been shown and described in detail to illustrate the application of the principles of the invention, it will be understood that the invention may be embodied otherwise without departing from such principles. By way of example and not limitation, while the above-described resonant cylinder 30 was optimized to be resonant at 100 kHz, it is also possible to modify the resonant cylinder 30 to be optimized at other frequencies. The particular choice of frequency will depend upon the frequency of the acoustic emission source that is to be monitored by the present invention. In the case of large boilers, numerous FOAES might be required to cover all areas of interest. Similarly, these areas of interest might be capable of generating acoustic emissions having a broad range of source frequencies, so a plurality of FOAE sensors 40, some of which are individually optimized to sense vibrations of a different frequency than others of said plurality, might be employed. One or more FOAE sensors 40, one or more optimized for one or more a different frequencies, might thus be located so as to monitor the same general area. Through known multiple channel signal processing and/or multiplexing techniques, and tunable or programmable electronic filter circuit means 130, this plurality of FOAES 40 could be easily handled by a single system 100. Alternatively, it may be desirable to provide for several, separate systems to provide for enhanced redundancy and safety. Accordingly, all such variations and embodiments are properly within the scope and equivalents of the following claims.

We claim:

1. A fiber optic sensing system for detecting vibrations, comprising:

at least one fiber optic acoustic emission sensor (FOAES), the FOAES having a pair of optical fibers each having an end face received within opposite open ends of a hollow core and fixed therein, the end faces of the optical fibers in the hollow core facing each other and spaced by a distance from each other in the hollow core, the hollow core being fixed in a resonant cylinder and the cylinder being selected to resonate at a desired frequency; and signal processing means connected to the optical fibers for supplying light to and receiving light from the optical fibers and for measuring variations in optical phase which results in changes in the light intensity due to vibrations of the hollow core.

2. A fiber optic sensing system according to claim 1, wherein said signal processing means further comprises laser light transmitter/receiver means optically coupled to said FOAES via fiber optic coupler means to controllably provide laser light to compensate for temperature changes of the FOAES to maintain optimum sensitivity.

3. A fiber optic sensing system according to claim 2, further comprising wide band photodiode receiver means for receiving light from said FOAES and producing an electrical signal indicative thereof; and control computer and operator interface means, operatively connected to said laser light transmitter/receiver means and to said wide band photodiode receiver means, for controlling said laser light transmitter/receiver means to transmit light to said at least one FOAES at desired times, and for processing said signals indicative of light received from said FOAES to identify signal characteristics exceeding a preset threshold value and producing a signal indicative thereof.

4. A fiber optic sensing system according to claim 3, wherein said signals indicative of signal characteristics from said FOAES exceeding a preset threshold value are provided to one of an alarm, a data acquisition system, and a real-time display means.

5. A fiber optic sensing system according to claim 2, wherein said laser light transmitter/receiver means comprises laser diode means for providing light to said FOAES via said fiber optic coupler means; a current source for energizing said laser diode means; photodiode and preamplifier circuitry means optically connected to said fiber optic coupler means for receiving light reflected from said FOAES and producing a signal indicative thereof; and smart microprocessor based feedback control circuitry means, operatively connected to said photodiode and preamplifier circuitry means and to said current source for modulating said current source to control the laser diode means output wavelength as a function of said received reflected light power from said FOAES.

6. A fiber optic sensing system according to claim 1, wherein the resonant cylinder in which the hollow core is fixed comprises a base plate connected to the cylinder having means for receiving the optical fibers and a cover connected to the base plate and over the resonant cylinder.

7. A fiber optic sensing system according to claim 6, wherein the base plate includes a slot through which the optical fibers pass for connection to signal processing means located outside the cover and away from the sensor.

8. A fiber optic sensing system according to claim 7, including an annular ridge around the base plate for receiving a lower end of the cover.

9. A fiber optic sensing system according to claim 8, wherein the base plate includes a substantially flat upper surface with a blind bore for receiving a lower end of the resonant cylinder.

10. A fiber optic sensing system according to claim 1, including a reflective coating on the end faces of each of the optical fibers.

11. A fiber optic sensing system according to claim 1, wherein the hollow core is glass, and wherein the end faces of the fibers are coated with one of a semiconductor oxide, a reflective metal film, or a series of dielectric films to increase the reflectivity of the bare ends of the optical fibers.

12. A fiber optic sensing system according to claim 1, further comprising a plurality of FOAE sensors, some of said plurality being optimized to sense vibrations of different frequencies than others of said plurality.

13. A fiber optic sensing system for detecting vibrations, comprising:

at least one fiber optic acoustic emission sensor (FOAES), the FOAES having a pair of optical fibers each having an end face received within opposite open ends of a precision hole of a resonant cylinder and the cylinder being selected to resonate at a desired frequency, means for fixing the optical fibers within the precision hole such that the end faces of the optical fibers in the precision hole are facing each other and spaced by a distance from each other; and signal processing means connected to the optical fibers for supplying light to and receiving light from the optical fibers and for measuring variations in optical phase which results in changes in the light intensity due to vibrations of the resonant cylinder.

14. A fiber optic sensing system according to claim 13, wherein said signal processing means further comprises laser light transmitter/receiver means optically coupled to said FOAES via fiber optic coupler means to controllably provide laser light to compensate for temperature changes of the FOAES to maintain optimum sensitivity.

15. A fiber optic sensing system according to claim 14, further comprising wide band photodiode receiver means for receiving light from said FOAES and producing an electrical signal indicative thereof; and control computer and operator interface means, operatively connected to said laser light transmitter/receiver means and to said wide band photodiode receiver means, for controlling said laser light transmitter/receiver means to transmit light to said at least one FOAES at desired times, and for processing said signals indicative of light received from said FOAES to identify signal characteristics exceeding a preset threshold value and producing a signal indicative thereof.

16. A fiber optic sensing system according to claim 15, wherein said signals indicative of signal characteristics from said FOAES exceeding a preset threshold value are provided to one of an alarm, a data acquisition system, and a real-time display means.

17. A fiber optic sensing system according to claim 14, wherein said laser light transmitter/receiver means comprises laser diode means for providing light to said FOAES via said fiber optic coupler means; a current source for energizing said laser diode means; photodiode and preamplifier circuitry means optically connected to said fiber optic coupler means for receiving light reflected from said FOAES and producing a signal indicative thereof; and smart microprocessor based feedback control circuitry means, operatively connected to said photodiode and preamplifier circuitry means and to said current source for modulating said current source to control the laser diode means output wavelength as a function of said received reflected light power from said FOAES.

18. A fiber optic sensing system according to claim 13, wherein the resonant cylinder in which the optical fibers are fixed comprises a base plate connected to the cylinder having means for receiving the optical fibers and a cover connected to the base plate and over the resonant cylinder.

19. A fiber optic sensing system according to claim 18, wherein the base plate includes a slot through which the optical fibers pass for connection to signal processing means located outside the cover and away from the sensor.

20. A fiber optic sensing system according to claim 19, including an annular ridge around the base plate for receiving a lower end of the cover.

21. A fiber optic sensing system according to claim 20, wherein the base plate includes a substantially flat upper surface with a blind bore for receiving a lower end of the resonant cylinder.

22. A fiber optic sensing system according to claim 13, including a reflective coating on the end faces of each of the optical fibers.

23. A fiber optic sensing system according to claim 13, wherein the end faces of the fibers are coated with one of a semiconductor oxide, a reflective metal film, or a series of dielectric films to increase the reflectivity of the bare ends of the optical fibers.

24. A fiber optic sensing system according to claim 13, further comprising a plurality of FOAE sensors, some of said plurality being optimized to sense vibrations of different frequencies than others of said plurality.

* * * * *